(12) United States Patent
Li et al.

(10) Patent No.: US 7,182,473 B2
(45) Date of Patent: Feb. 27, 2007

(54) LENS COVER SET

(75) Inventors: Chien-Ming Li, Linkou Township, Taipei County (TW); Ko-Hsien Lee, Fongshan (TW); Shu-Mei Chien, Bade (TW)

(73) Assignee: BenQ Corporation, Taoyuan Shien (TW)

( * ) Notice: Subject to any disclaimer, the term of this patent is extended or adjusted under 35 U.S.C. 154(b) by 176 days.

(21) Appl. No.: 10/990,446

(22) Filed: Nov. 18, 2004

(65) Prior Publication Data

US 2005/0105062 A1    May 19, 2005

(30) Foreign Application Priority Data

Nov. 18, 2003  (TW) ............................... 92132344 A

(51) Int. Cl.
*G03B 21/14*  (2006.01)
*B03B 21/22*  (2006.01)

(52) U.S. Cl. ...................................... 353/100; 353/119
(58) Field of Classification Search ................ 353/100, 353/101, 119, 122; 359/808, 818, 511, 513
See application file for complete search history.

(56) References Cited

U.S. PATENT DOCUMENTS

| 6,190,015 B1* | 2/2001 | Tsai et al. .................... 353/101 |
| 6,778,338 B2* | 8/2004 | Liu et al. ..................... 359/808 |
| 6,808,273 B2* | 10/2004 | Morinaga .................... 353/119 |

* cited by examiner

*Primary Examiner*—Melissa Jan Koval
*Assistant Examiner*—Andrew Kong
(74) *Attorney, Agent, or Firm*—Rabin & Berdo, PC

(57) ABSTRACT

A lens cover set, used with a lens disposed on an electronic product, includes a lens cover and a lens jacket. The lens cover is disposed on a housing of the electronic product and is used for containing the lens. The lens jacket is installed on the lens cover adjustably and hoops the lens by leaving a gap. By way of adjusting a relative position between the lens jacket and the lens cover so that the gap can be modulated.

10 Claims, 7 Drawing Sheets

LENS COVER SET

This application claims the benefit of Taiwan application Ser. No. 92132344, filed Nov. 18, 2003, the subject matter of which is incorporated herein by reference.

BACKGROUND OF THE INVENTION

1. Field of the Invention

The invention relates in general to a lens cover set used with a lens, and more particularly to a lens cover set including a lens jacket adjustably installed on a lens cover.

2. Description of the Related Art

With the advanced development of 3C (consuming electronics product, computer and communication) industries, projectors have been an important part of modern office equipments. One of the essential parts of a projector is a lens. Because the lens is easily scratched or rubbed against dust or other external matters, it is necessary to provide a lens cover for protecting the lens.

FIG. 1 is a schematic diagram illustrating a conventional projector. Referring to FIG. 1, a conventional projector 100 mainly includes a housing 102, a lens 104, and a lens cover 106. The lens 104 is disposed inside the housing 102 of the projector 100, and the lens cover 106 is disposed on the housing 102. The lens cover 106 is used for containing and protecting the lens 104.

FIG. 2 is a schematic diagram illustrating the lens cover of the conventional projector in FIG. 1. Referring both to FIG. 1 and FIG. 2, the lens cover 106 includes a receiving space 108 for containing the lens 104. Generally, when an apparatus or a mechanism is constituted by more than one component, a tolerance could be produced between two different components during fabricating and assembling. Therefore, after the lens cover 106 and the housing 102 of the projector 100 are assembled to form the outer covering of the projector 100, an interference could be generated due to the tolerance produced by assembling the lens 104 and the lens cover 106 of the projector 100.

Referring to FIG. 3, it is a schematic diagram illustrating the relative position of the conventional lens cover and the lens contained therein. Conventionally, in order to eliminate the interference due to the tolerance produced by fabricating the lens 104 and the lens cover 106, a design of comparatively larger aperture is employed for the receiving space 108 of the lens cover 106 than the diameter of the lens 104, as shown in FIG. 3. As a result, gaps 110a and 110b are between the lens 104 and the lens cover 106, so that sufficient space can avoid the lens 104 interfering with the lens cover 106. However, light escapes out of the housing 102 of the projector 100 from the gaps 110a and 110b by the design of comparatively larger aperture employed for the receiving space 108 of the lens cover 106. Moreover, considering the external appearance required to meet the aesthetic feeling, it is not applicable when the comparatively larger aperture of the receiving space 108 includes large gaps because the components inside the housing 102 of the projector 100 are seen directly by users and the external appearance is greatly influenced.

SUMMARY OF THE INVENTION

In view of the foregoing, it is an object of the present invention to provide a lens cover set that not only eliminates the interference due to the tolerance produced by fabricating the lens cover and the lens jacket of a projector, but also prevents escape of lights within the housing of the projector. Moreover, all components installed inside the projector are covered by the housing of the project so that the external appearance required to meet the aesthetic feeling is kept.

The invention achieves the above-identified object by providing a lens cover set used with a lens disposed on an electronic product. The lens cover set includes a lens cover and a lens jacket. The lens cover is disposed on a housing of the electronic product and is used for containing the lens. The lens jacket is installed on the lens cover adjustably and hoops the lens by leaving a gap. By way of adjusting a relative position between the lens jacket and the lens cover so that the gap can be modulated.

The lens cover has a positioning mechanism and the lens jacket has a joint mechanism with respect to the positioning mechanism. The joint mechanism includes at least one joint hole and one joint device. The joint holes are disposed on the lens jacket, and the joint devices are used for connecting the lens jacket and the lens cover by penetrating through the joint holes.

Also, the lens jacket has a modulating mechanism for modulating a relative position of the lens jacket. The modulating mechanism includes a screw hole and an adjusting screw. The screw hole is disposed on the lens jacket and the adjusting screw is disposed on the lens cover for modulating the gap between the lens jacket and the lens cover by adjusting the adjusting screw with respect to the screw hole. The lens cover further includes a screw notch with respect to the screw hole and the adjusting screw is disposed within the screw notch.

Other objects, features, and advantages of the invention will become apparent from the following detailed description of the preferred but non-limiting embodiments. The following description is made with reference to the accompanying drawings.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like components throughout.

Figure 1:
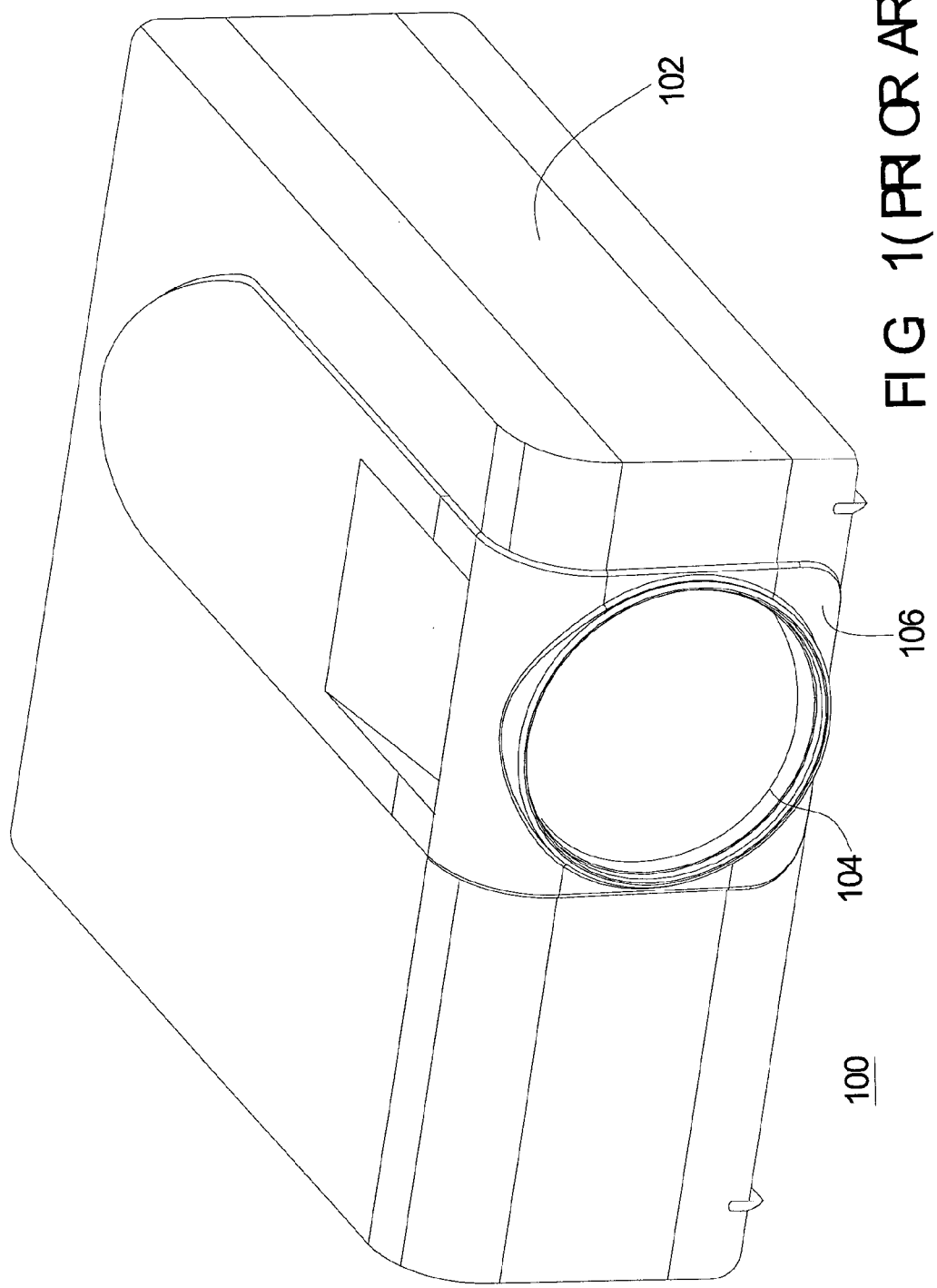
FIG. 1 (Prior Art) is a schematic diagram illustrating a conventional projector.
Figure 2:
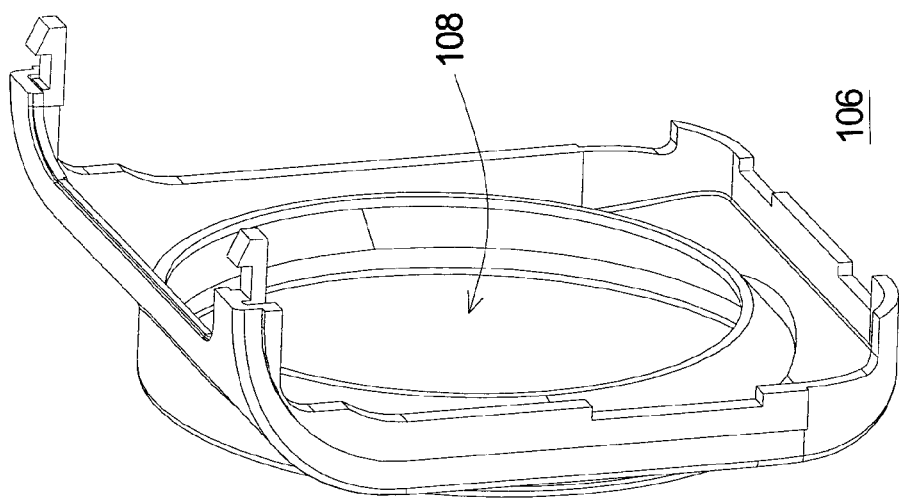
FIG. 2 (Prior Art) is a schematic diagram illustrating the lens cover of the conventional projector in FIG. 1.
Figure 3:
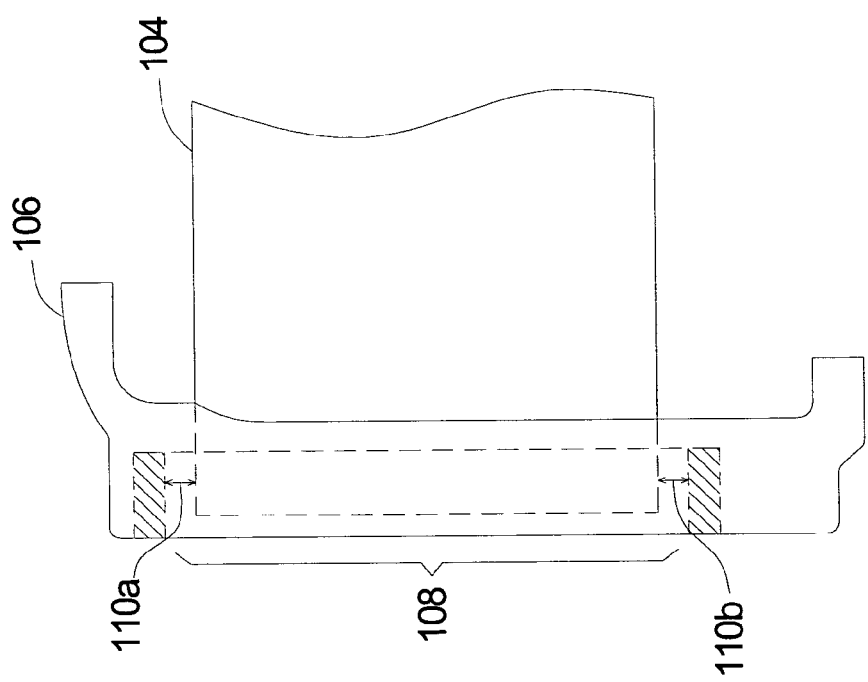
FIG. 3 (Prior Art) is a schematic diagram illustrating the relative position of the conventional lens cover and the lens contained therein.
Figure 4:
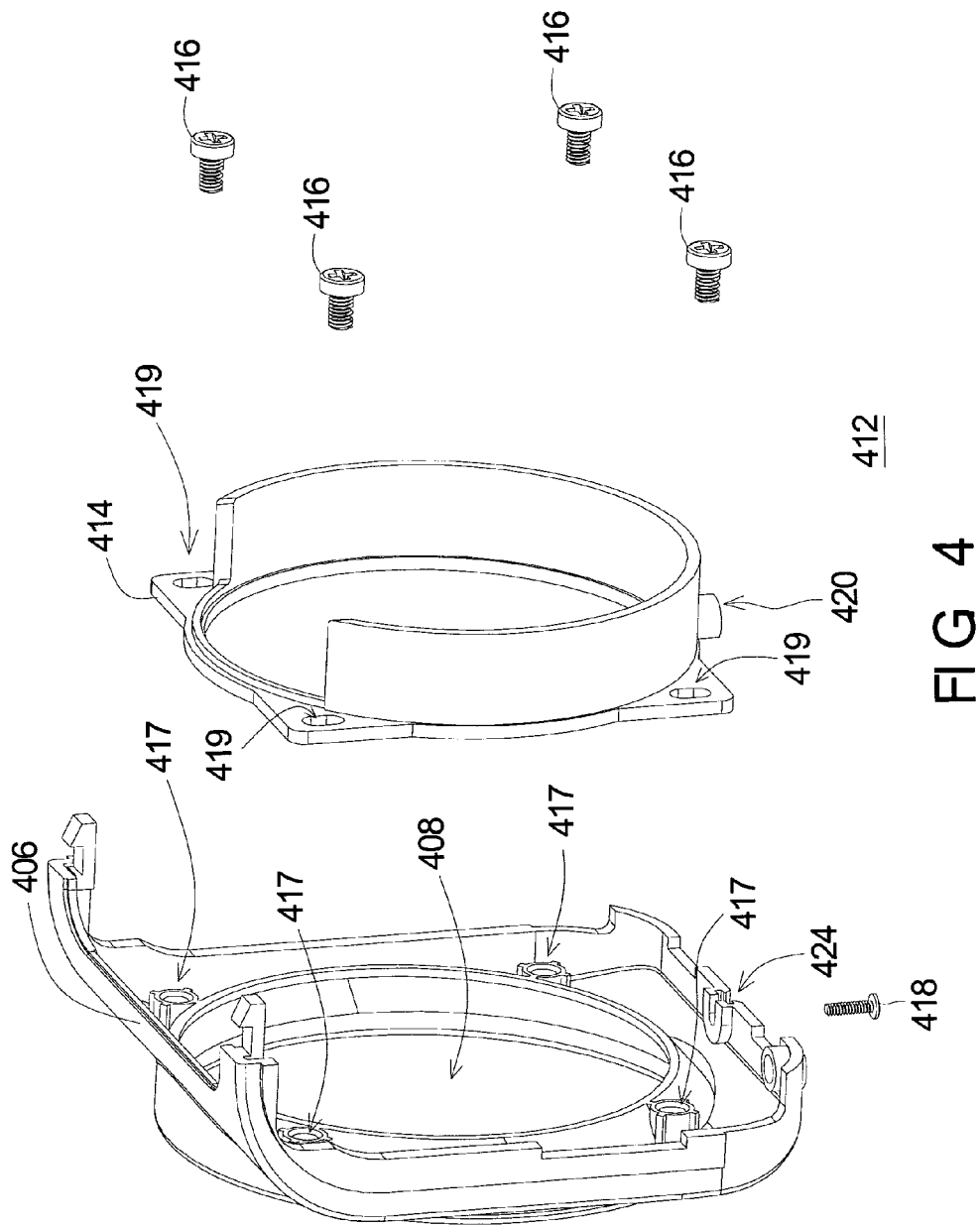
FIG. 4 is an exploded view of a lens cover set according to the present invention.
Figure 5:
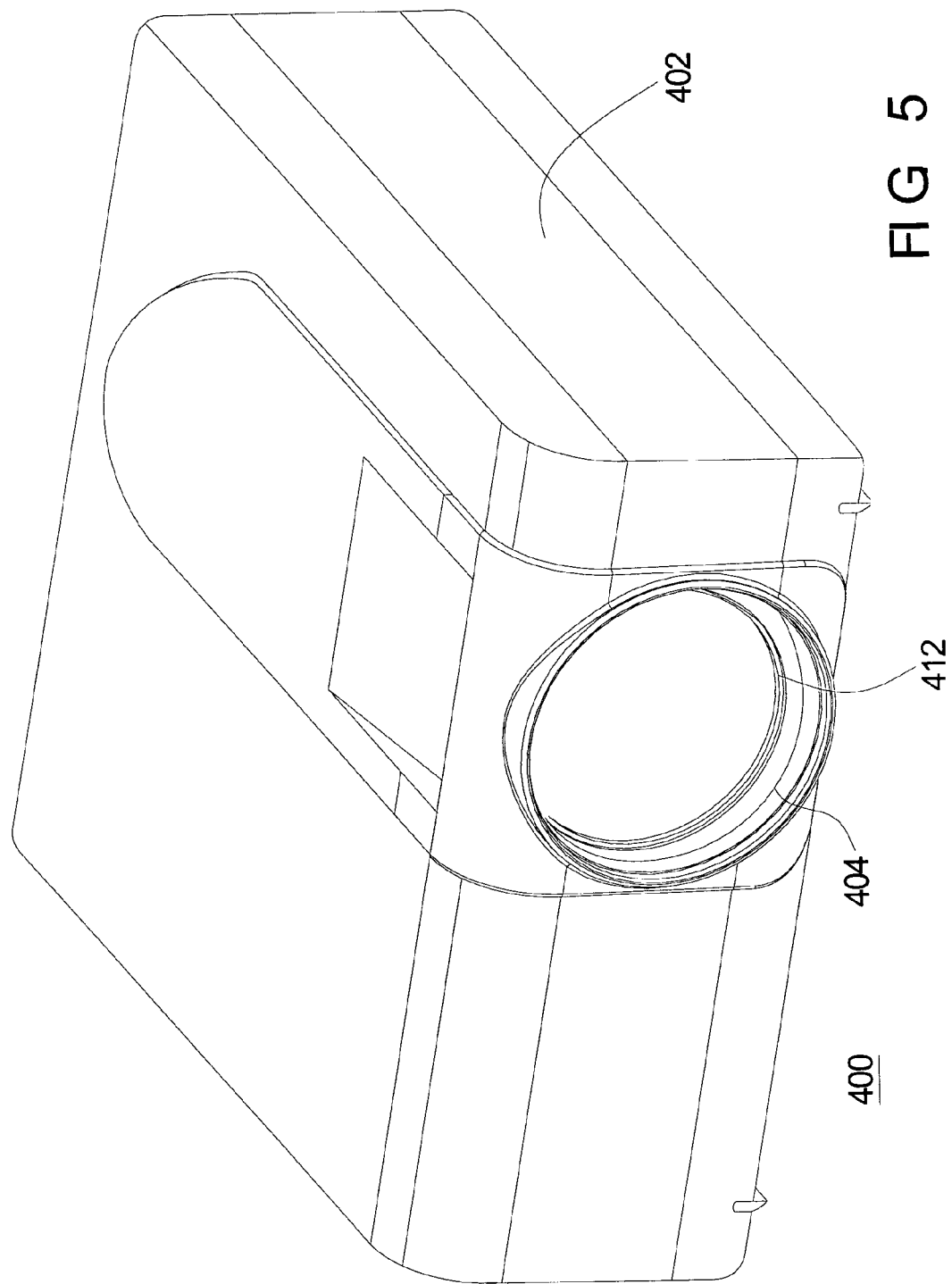
FIG. 5 is a schematic diagram illustrating the lens cover set of the present invention being installed on a housing of a projector.

Referring both to FIG. 4 and FIG. 5, FIG. 4 is an exploded view of a lens cover set according to the present invention, and FIG. 5 is a schematic diagram illustrating the lens cover set of the present invention being installed on a housing of a projector. A lens cover set 412 is used with a lens 404 disposed on an electronic product, such as a projector 400 in the present embodiments. The lens cover set 412 includes a lens cover 406 and a lens jacket 414. The lens cover 406 is disposed on the housing 402 of the projector 400 and is used for containing and protecting the lens 404.

The lens cover 406 has a positioning mechanism, and the lens jacket 414 has a joint mechanism with respect to the positioning mechanism. The positioning mechanism includes at least one joint notch 417, and the joint mechanism includes at least one joint hole 419 and at least one joint device 416. The joint holes 419 are preferred oval-shaped, and the joint devices 416 are preferred several screws. The joint holes 419 are disposed on the lens jacket 414 with respect to the joint notches 419 respectively. The joint devices 416 are used for connecting the lens jacket 414 and the lens cover 406 by penetrating through the joint holes 419 into the joint notches 417, so that the lens jacket 414 is connected and disposed on the lens cover 406.

Figure 6:
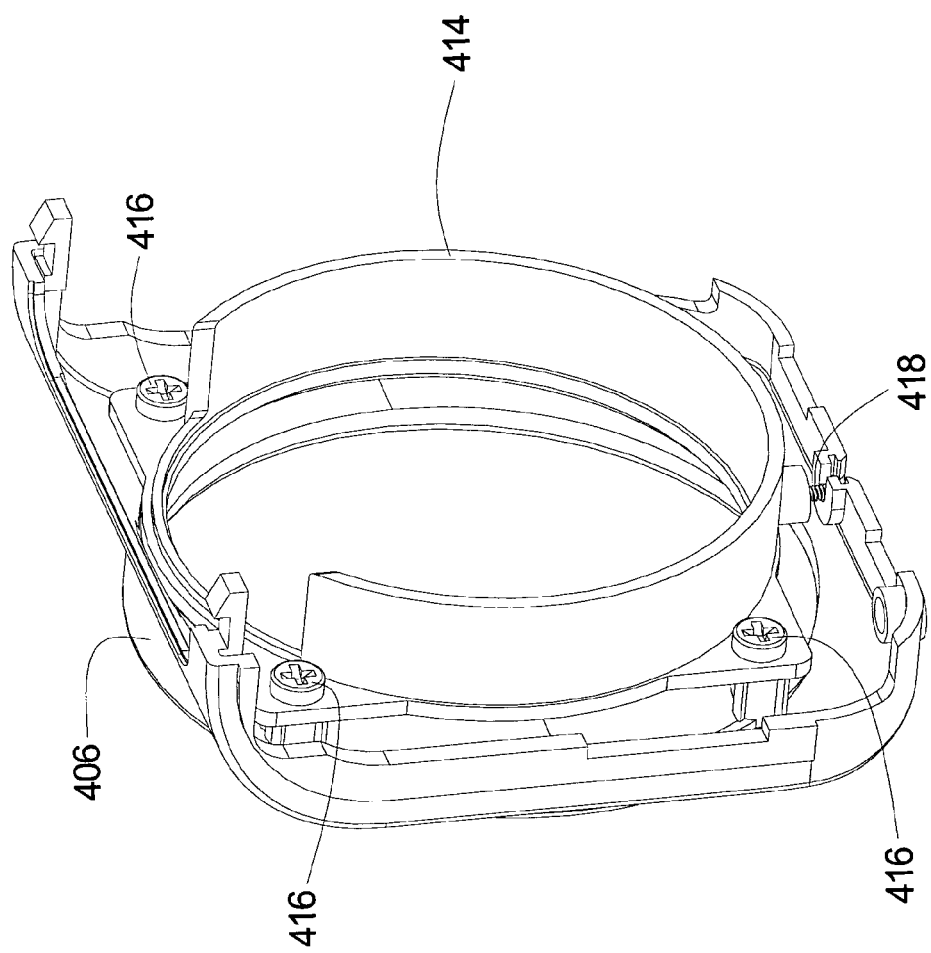
FIG. 6 is a schematic diagram illustrating the combination of all parts of the lens cover set.
Figure 7:
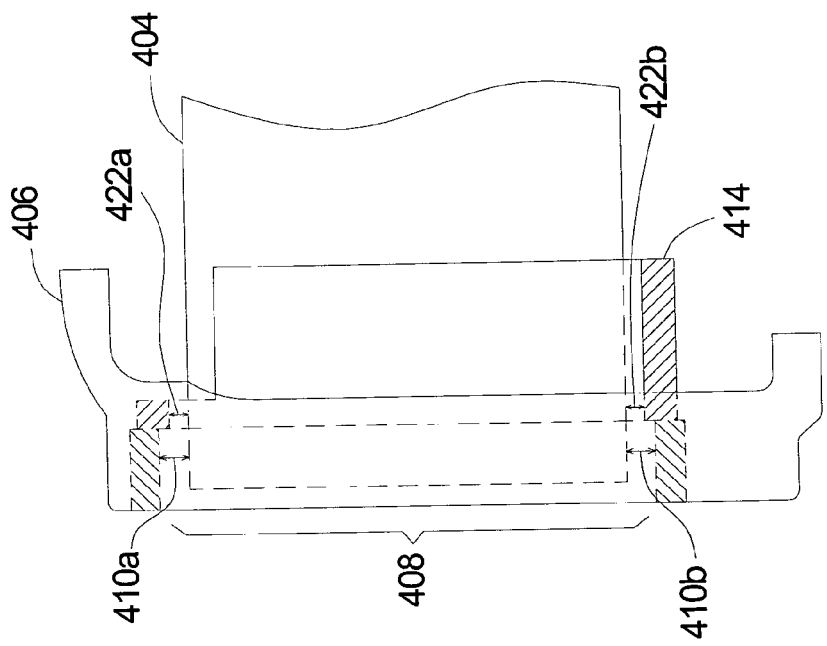
FIG. 7 is a schematic diagram illustrating the relative position of the lens cover set and the lens contained therein.

FIG. 6 is a schematic diagram illustrating the combination of all parts of the lens cover set, and FIG. 7 is a schematic diagram illustrating the relative position of the lens cover set and the lens contained therein. For the reason of clear explanation, the joint devices 416, the joint hole 419, the screw hole 420, the adjusting screw 418 and the screw notch 424, which are shown in FIG. 4, are not shown in FIG. 7. Referring to FIG. 4, FIG. 6 and FIG. 7 together, the lens jacket 414 is installed on the lens cover 406 adjustably and hoops the lens 404 by leaving a gap, such as gaps 422a and 422b.

The lens jacket 414 has a modulating mechanism for modulating a relating position of the lens jacket 414 to the lens 404. The modulating mechanism includes a screw hole 420 and an adjusting screw 418. The lens cover 406 has a screw notch 424 positioned with respect to the screw hole 420. The screw hole 420 is disposed on the lens jacket 414 and the adjusting screw 418 is disposed within the screw notch 424 on the lens cover 406.

Therefore, by ways of turning the adjusting screw 418, the lens jacket 414 is adjustable with respect to the lens cover 406. Also, the gaps 422a and 422b between the lens jacket 414 and the lens 404 are modulated when the lens 404 is contained in the receiving space 408 of the lens cover 406.

The gaps 422a and 422b between the lens jacket 414 and the lens 404 are smaller than the gaps 410a and 410b between the frame of receiving space 408 of the lens cover 406 and the lens 404, so that the lights within the housing 402 of the projector 400 is effectively kept and the escape of lights is prevented. Besides, all components installed inside the projector are covered by the housing 402 with small gaps 422a and 422b of the project 400, so that the external appearance of the projector 400 meets the requirements for aesthetic feeling.

Adjusting the adjusting screw 418 and modulating the relative position of the lens jacket 414 related to the lens 404 to adjust small gaps 422a and 422b also can avoid the lens jacket 414 interfering with the lens 404.

The lens cover set 412 described in the preferred embodiment is not limited in projectors. On the other hand, the lens cover set 412 can be applied in any apparatus or mechanism with lens. Besides, the lens cover 406 of the lens cover set 412 can also be molded with the housing 402 as a whole.

As described hereinbefore, by employing the lens cover set 412 according to the preferred embodiment of the present invention, the lens cover set 412 can eliminate the interference due to the tolerance produced by fabricating the lens cover set 412 and the lens 404 and prevent escape of lights within the housing 402 of the projector 400. Moreover, all components installed inside the projector 400 are covered by the housing 402 so that all components are protected well and the external appearance required to meet the aesthetic feeling is kept.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A lens cover set, used with a lens disposed on an electronic product, comprising:
    a lens cover, disposed on a housing of the electronic product and used for containing the lens; and
    a lens jacket, adjustably installed on the lens cover and being sleeved over the lens in a clearance fit, to leave a gap between an outer circumference of the lens and an inner surface of said lens jacket;
    wherein adjusting a relative position between the lens jacket and the lens cover modulates the gap.

2. The lens cover set according to claim 1, wherein the lens cover has a positioning mechanism, and the lens jacket has a joint mechanism corresponding to the positioning mechanism.

3. The lens cover set according to claim 1, wherein the electronic product is a projector.

4. A lens cover set, used with a lens disposed on an electronic product, comprising:
    a lens cover, disposed on a housing of the electronic product and used for containing the lens; and
    a lens jacket, adjustably installed on the lens cover and hooping the lens by leaving a gap;
    wherein adjusting a relative position between the lens jacket and the lens cover modulates the gap;
    wherein the lens cover has a positioning mechanism, and the lens jacket has a joint mechanism corresponding to the positioning mechanism; and
    wherein the joint mechanism comprises:
        at least a joint hole, disposed on the lens jacket, and
        at least a joint device for connecting the lens jacket and the lens cover by penetrating through the joint holes.

5. The lens cover set according to claim 4, wherein the lens jacket has a modulating mechanism for modulating a relative position of the lens jacket.

6. The lens cover set according to claim 5, wherein the modulating mechanism comprises:
    a screw hole, disposed on the lens jacket, and
    an adjusting screw, disposed on the lens cover and screwed into the screw hole, wherein rotating the adjusting screw modulates the gap between the lens jacket and the lens cover.

7. The lens cover set according to claim 6, wherein the lens cover further comprises a screw notch with respect to the screw hole for accommodating the adjusting screw.

8. The lens cover set according to claim 4, wherein the joint hole is oval-shaped.

9. The lens cover set according to claim 4, wherein the joint device is a screw.

10. A lens cover set, used with a lens disposed on an electronic product, comprising:
- a lens cover, disposed on a housing of the electronic product and used for containing the lens; and
- a lens jacket, adjustably installed on the lens cover and being sleeved over the lens in a clearance fit, to leave a gap between an outer circumference of the lens and an inner surface of said lens jacket;
- wherein adjusting a relative position between the lens jacket and the lens cover modulates the gap; and
- wherein the lens jacket has a modulating mechanism for changing a position of the lens jacket relative to the lens cover to modulate the gap.

* * * * *